United States Patent

[11] 3,583,455

[72] Inventor Efrem M. Ostrowsky
    Highland Park, Ill.
[21] Appl. No. 807,480
[22] Filed Feb. 26, 1969
[45] Patented June 8, 1971
[73] Assignee Nibot Corporation
    Chicago, Ill.

[54] GRATER
    18 Claims, 8 Drawing Figs.
[52] U.S. Cl. .................................................. 146/180
[51] Int. Cl. .......................................... A47j 43/00,
                                                    A23n 1/02
[50] Field of Search .......................................... 144/177,
                                                    180, 3.5

[56] References Cited
    UNITED STATES PATENTS
    562,372   6/1896  Bouton ........................... 146/3
    2,505,114 4/1950  Hayman et al. ................ 146/180
    2,781,069 2/1957  Byrd ............................... 146/3

Primary Examiner—Willie G. Abercrombie
Attorney—Prangley, Clayton, Mullin, Dithmar and Vogel ABSTRACT: A manual grater for foodstuffs is molded of synthetic thermoplastic resinous material and includes a hollow body having integral sidewalls inclined to the longitudinal axis of the body divergently in a direction from one end to an opposite open end thereof, the sidewalls each having an external grating surface curved convexly both longitudinally and transversely, grating teeth integral with each of the grating surfaces in spaced longitudinal and transverse relation thereon and projecting outwardly substantially equidistantly therefrom facing the said one end, means forming grating openings adjacent the teeth in at least part of the sidewalls, an annular support extending laterally outwardly from the body therearound at the said open end thereof and integrally joined thereto, the support comprising means for mounting the grater alternatively on the rim of a bowl for use or for storage, or on a flat surface for use, including surfaces lying in planes substantially normal to the longitudinal axis for seating engagement with the bowl rim and with the flat surface respectively, and means forming discharge openings between the body and the support adjacent the respective sidewalls, whereby the grater is adapted for grating material downwardly on the grating surfaces over the bowl or flat surface on which the grater is seated for use while minimizing hand contact with the teeth, and grater material passes through the grating openings and the discharge openings and may be collected in the bowl. A grater assembly includes the combination of such grater and a bowl having a rim engageable with the seating surfaces of the annular support for mounting the grater thereon for use or for storage, the bowl rim encompassing the discharge openings in use for collecting grated material which passes through the discharge openings together with grated material which passes through the grating openings, and the bowl receiving the grater body therein for storage.

PATENTED JUN 8 1971

INVENTOR
EFREM M. OSTROWSKY
BY
Prangley, Baird, Clayton,
Miller & Vogel ATTYS.

PATENTED JUN 8 1971

GRATER

This invention relates to a manual grater for foodstuffs which is employed as a kitchen utensil, and to a combination of the grater and a bowl on which the grater may be mounted for use or for storage and which serves to collect grated materials.

A common type of grater conventionally employed as a kitchen utensil is constructed of metal and has four flat inclined sides provided with grating teeth and adjacent openings therein. Foodstuffs are grated while holding the utensil on a suitable surface or in a wide bowl or other receptacle. Use of the grater in a bowl frequently is less than satisfactory or is inconvenient, and it may be necessary to use an extra bowl. Care must be exercised in using the conventional grater to avoid injuring the fingers by contact with the grater teeth.

An important object of the present invention is to provide a manual grater molded of synthetic thermoplastic resinous material and including a body having an external grating surface inclined to the longitudinal axis of the body divergently in a direction from one end to an opposite end of the body, a plurality of grating teeth integral with the grating surface in spaced longitudinal and transverse relation thereon and projecting outwardly therefrom facing the said one end of the body, and support means extending laterally outwardly from the body therearound at the said opposite end thereof and integrally joined thereto, the support means comprising means for mounting the grater on the rim of a bowl for use including a surface lying in a plane substantially normal to the longitudinal axis for seating engagement with the bowl rim, whereby the grater is adapted for grating material downwardly on the grating surface over a bowl on which the grater is mounted. The grater thus is constructed for convenient, secure and stable mounting on a bowl, and the user may grate materials easily and rapidly while the grater and the bowl stay in place without sliding or tipping.

A more specific object is to provide a grater of the foregoing construction that includes means forming an opening between the grater body and the support means adjacent the grating surface for discharging grated material therethrough in use. Grated material which falls along the grating surface may be collected in a bowl on which the grater is mounted.

Another important object is to provide a grater of the foregoing construction wherein the grating surface is curved convexly both longitudinally and transversely, and the grating teeth project substantially equidistantly therefrom, thereby minimizing hand contact with the teeth in use. The structure serves to reduce the incidence of finger cuts and abrasions.

An additional object of the invention is to provide a manual grater molded of synthetic thermoplastic resinous material and including a hollow body having a plurality of integral sidewalls inclined to the longitudinal axis of the body divergently in a direction from one end to an opposite end thereof, the sidewalls each having an external grating surface curved convexly both longitudinally and transversely, and a plurality of grating teeth integral with each of the grating surfaces in spaced longitudinal and transverse relation thereon and projecting outwardly substantially equidistantly therefrom facing the said one end of the body, whereby the grater is adapted for use with the longitudinal axis extending vertically and the said one end of the body uppermost for grating material downwardly on the grating surfaces while minimizing hand contact with the teeth.

Another object is to provide a grater of the foregoing construction which also includes an annular support extending laterally outwardly from the grater body therearound at the said opposite end thereof and integrally joined thereto, the support having surfaces lying in planes substantially normal to the longitudinal axis for seating engagement with the rim of a bowl or a flat surface on which the grater may be mounted for use. The grater thus may be used on a bowl which serves to collect the grated material or on a flat work surface such as a counter or table top.

An additional object is to provide a manual grater molded of synthetic thermoplastic resinous material and including a hollow body having a plurality of integral sidewalls inclined to the longitudinal axis of the body divergently in a direction from one end to an opposite open end thereof, the sidewalls each having an external grating surface, a plurality of grating teeth integral with each of the grating surfaces in spaced longitudinal and transverse relation thereon and projecting outwardly therefrom facing the said one end of the body, means forming grating openings adjacent the teeth in at least part of the sidewalls, an annular support extending laterally outwardly from the body therearound at the said open end thereof and integrally joined thereto, the support comprising means for mounting the grater alternatively on the rim of a bowl or on a flat surface for use including surfaces lying in planes substantially normal to the longitudinal axis for seating engagement with the bowl rim and with the flat surface respectively, and means forming discharge openings between the body and the support adjacent the respective sidewalls, whereby the grater is adapted for grating material downwardly on the grating surfaces over a bowl or flat surface on which the grater is mounted and grated material passes through the grating openings and the discharge openings and may be collected in the bowl.

A particular object is to provide a grater of the foregoing construction wherein the support includes a ledge for supporting the grater on the rim of a bowl with the grater body disposed alternatively outside the bowl for use or inside the bowl for storage, and an integral band projecting longitudinally beyond the ledge in opposite directions for alternatively securing the grater on a bowl when supported on the rim thereof in either of the said body dispositions or supporting the grater on a flat surface for use. The grater thus may be mounted on a bowl for use, with the above-described advantages, and also may be stored compactly in the bowl with which it is to be used.

A further object is to provide a grater of the foregoing construction having three inclined longitudinally and transversely curved sidewalls integrally joined by similarly inclined longitudinally and transversely curved corner portions, and having an integral closure at the said one end of the grater body forming a curved triangular ridge with the sidewalls and corner portions and including a recessed end wall bounded by the said ridge. The structure is strong and rigid, conveniently held by the user, and open and accessible for easy cleaning.

Another object is to provide a grater assembly which includes the combination of a grater having the foregoing construction and a bowl having a rim engageable with the grater support means for mounting the grater thereon for use.

Another particular object is to provide a grater assembly including a grater having the foregoing construction and a bowl having a rim engageable with the grater support ledge adjacent to the support band for mounting the grater on the bowl rim in either of the use and storage dispositions of the grater body, the bowl rim encompassing the grater discharge opening in use for collecting grated material which passes through the discharge openings together with grated material which passes through the grating openings, and the bowl receiving the grater body therein for storage.

Additional objects of the invention include the provision of a lightweight, durable, economical and versatile grater suitable for use with various foodstuffs while accomplishing the foregoing objects and providing the described and other advantages and functions. Further features of the invention pertain to the particular arrangement of the parts in a unitary structure whereby the foregoing and other objects are achieved.

The foregoing and other objects, advantages and functions of the invention will be apparent on reference to the following description taken in conjunction with the accompanying drawings, which illustrate preferred embodiments of the new grater and the new grater assembly, and in which.

Figure 1:
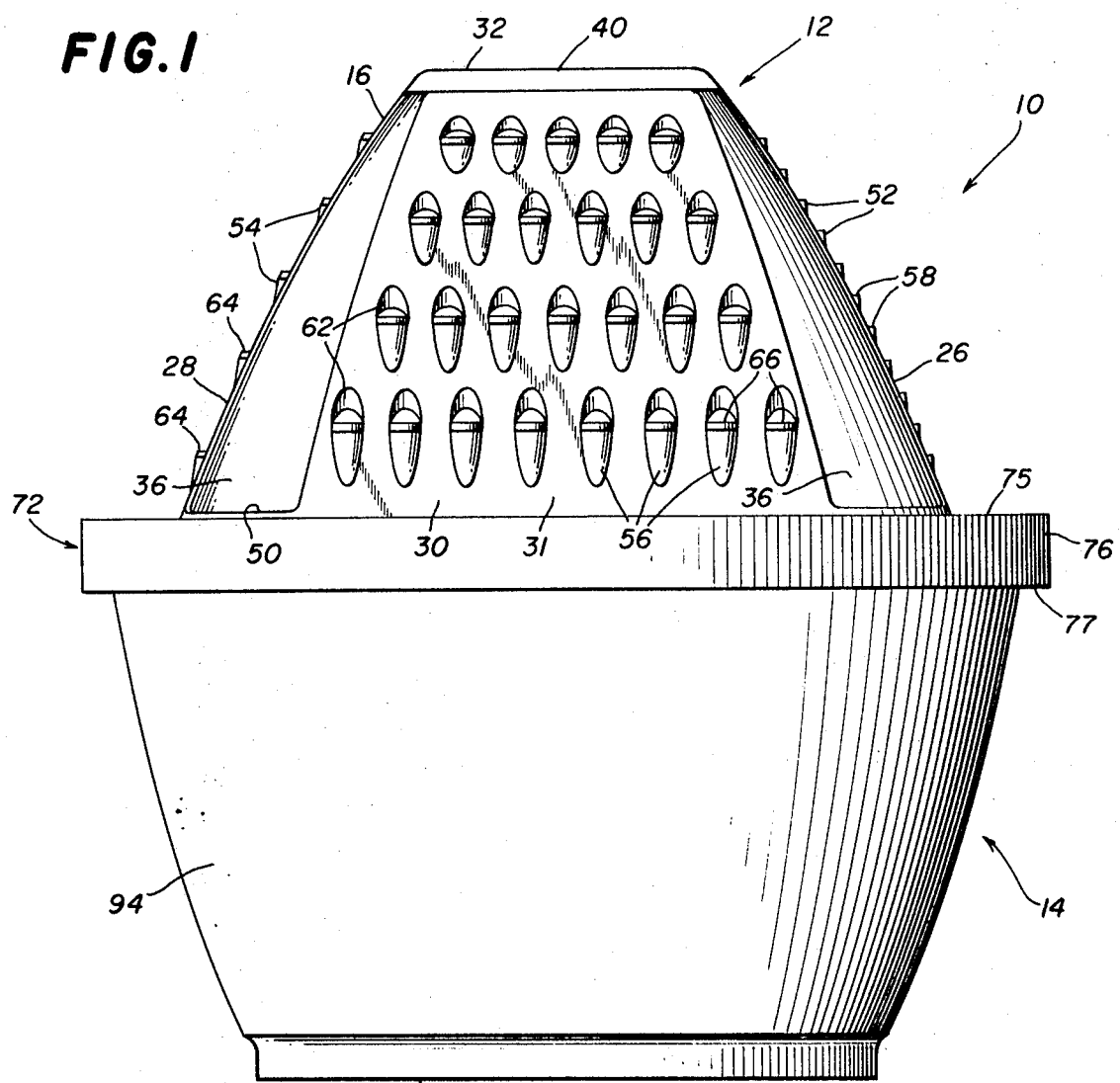
FIG. 1 is a side elevational view of a grater assembly according to the invention, illustrating a grater mounted on a bowl in position for use.
Figure 2:
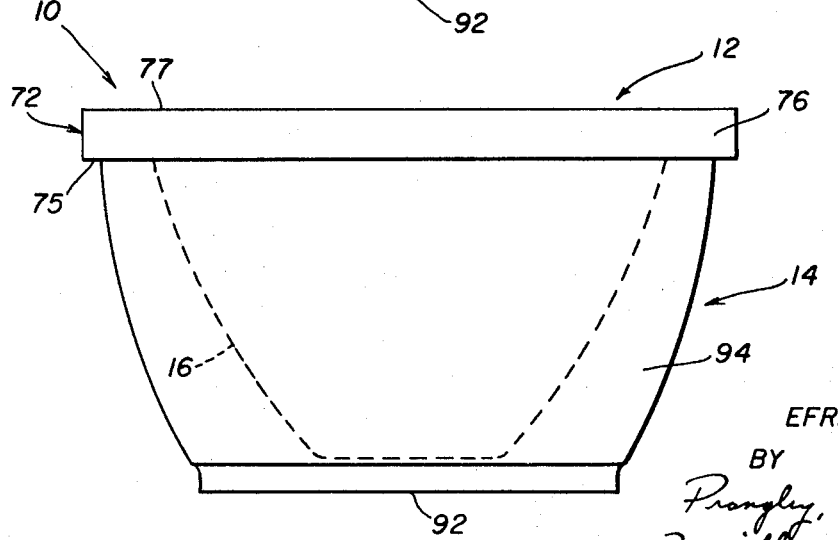
FIG. 2 is a side elevational view on a smaller scale of the grater assembly, illustrating the grater mounted on the bowl for storage.
Figure 6:
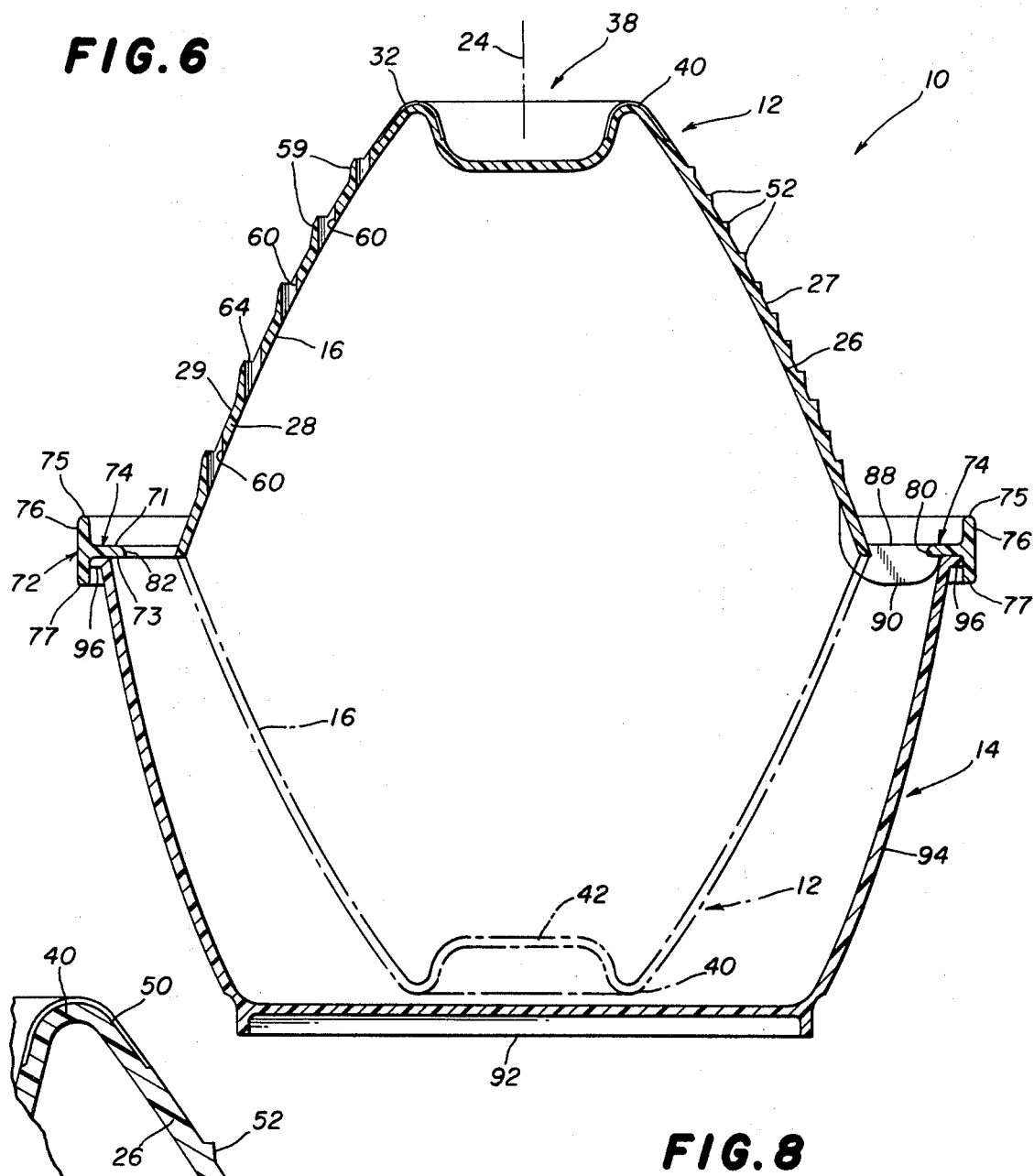
FIG. 6 is a longitudinal sectional view of the grater assembly, taken on irregular line 6—6 of FIG. 3 and on substantially the same scale, illustrating the grater in its alternative use and storage positions on the bowl, shown in full and phantom lines, respectively.

Referring to the drawings, a grater assembly 10 constituting a preferred embodiment of the invention is illustrated in FIGS. 1, 2 and 6. The assembly includes a manual grater 12, also illustrated in FIG. 3, and a bowl 14. The grater 12 is illustrated in position for use on the bowl 14 in FIG. 1 and in full lines in FIG. 6. The grater 12 is illustrated in its storage position on the bowl 14 in FIG. 2 and in phantom lines in FIG. 6. In an alternative manner of use, not illustrated, the grater 12 may be supported on a flat surface, such as a counter or table top, with the grater otherwise disposed as illustrated in FIG. 1.

The grater 12 is molded integrally in one piece of synthetic thermoplastic resinous material, to provide various advantages including those described above and others. The resinous material is selected to provide suitable strength and rigidity, and also for resistance to the constituents of various foodstuffs, particularly oils such as lemon oil. A preferred material of construction is an acrylonitrile-butadiene-styrene copolymer, such as Tybrene (Dow Chemical Co.). Another preferred material is polypropylene, and other synthetic organic thermoplastic resins might be employed. The bowl 14 may be constructed of any suitable material, and the illustrative embodiment is similarly constructed of synthetic thermoplastic resinous material.

The grater 12 includes a curved or rounded truncated generally pyramidal hollow body 16 molded to provide three integral sectors 18, 20 and 22 (FIG. 3) on 120° centers around the longitudinal axis 24 of the grater and its body. Upstanding sidewalls 26, 28 and 30 of generally trapezoidal configuration are formed in the respective sectors, and they have respective external grating surfaces 27, 29 and 31. The sidewalls are inclined to the longitudinal axis 24 divergently in a direction from one, narrow closed end 32 to the opposite, wide open end 34 of the body (see FIG. 6). The sidewalls are inclined at relatively small angles to the axis 24, about 27° in the illustrative embodiment. In normal use, the longitudinal axis 24 extends vertically, the closed end 32 constitutes the top of the body 16, and the open end 34 constitutes the bottom of the body.

Figure 3:
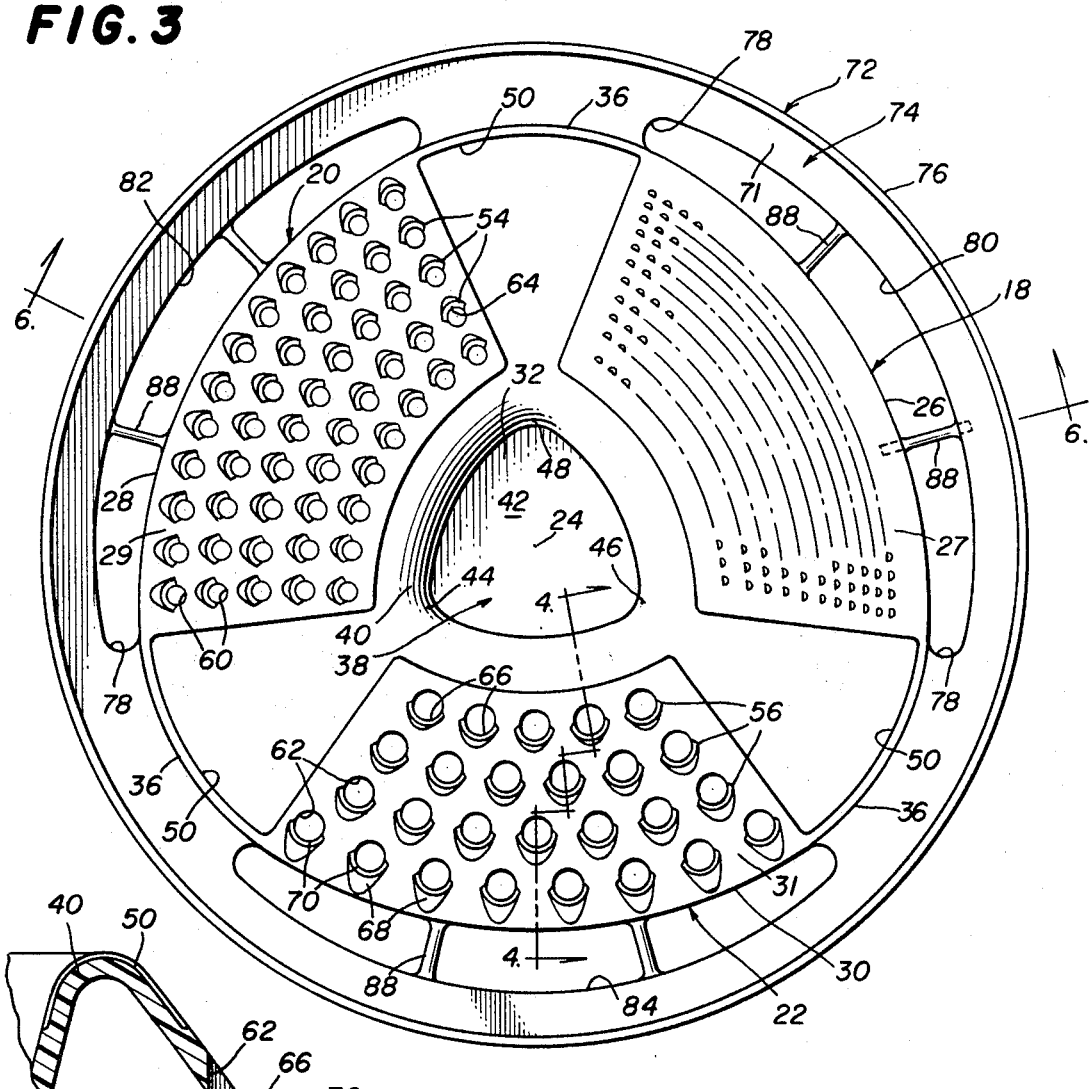
FIG. 3 is a top plan view of the grater substantially on the scale of FIG. 1.

The sidewalls 26, 28 and 30 are integrally joined by similarly inclined corner portions 36 (FIGS. 1 and 3). A crownlike end closure 38 is molded integrally with the sidewalls and the corner portions at the closed end 32 of the body. The closure forms a curved triangular ridge 40 with the sidewalls and corner portions, and includes a recessed end wall 42 bounded by the ridge.

The external grating surfaces 27, 29 and 31 of the sidewalls 26, 28 and 30 are transversely curved convexly on increasing radii about respective eccentric longitudinally extending axes of curvature 44, 46 and 48, as seen in FIG. 3. The axes of curvature are equiangularly disposed around and spaced from the longitudinal axis 24, and they intersect the respective apices of the ridge 40. The sides of the ridge are likewise curved about the respective axes of curvature at the apices opposite thereto. In a preferred embodiment of the invention, the radii of transverse curvature for the external grating surfaces 27, 29 and 31 increase from about 1⅞ inches at the top of the ridge 40 to 4 inches at the open end 34 of the body.

As illustrated in FIG. 6, the external grating surfaces 27, 29 and 31 of the sidewalls 26, 28 and 30 are also curved convexly in the longitudinal direction, on uniform relatively long radii of curvature. In the aforesaid preferred embodiment, the grating surfaces 27, 29 and 31 are curved longitudinally on 12-inch radii about centers located respectively on the opposite sides of the longitudinal axis 24 and spaced approximately 8.4 inches from the axis 24 and approximately 3.6 inches below the open end 34 of the body 16.

The corner portions 36 have external surfaces curved convexly and transversely on increasing radii about respective eccentric longitudinally extending axes of curvature providing shorter radii of curvature than for the grating surfaces 27, 29 and 31. The external surfaces of the corner portions 36 are also curved convexly in the longitudinal direction. The corner portions 36 thus are curved to merge with the sidewalls 26, 28 and 30, and provide a strong and rigid construction for the body 16. The body is also strengthened by the ridge 40. In the illustrative embodiment, a shallow decorative depression or recess 50 is provided in the corner portions 36, extends into the sidewalls 26, 28 and 30 around the ridge 40, and extends over the ridge, terminating on the inside of the ridge as seen in FIG. 6.

Small, medium and large size grating teeth 52, 54 and 56, respectively, are integrally formed on the grating surfaces 27, 29 and 31 of the respective sidewalls 26, 28 and 30. The teeth project outwardly substantially equidistantly from each of the grating surfaces, and they face the closed end 32 of the body 16. The teeth are arranged in spaced longitudinal and transverse relation on the grating surfaces. Thus, the teeth are arranged on each surface in successive spaced transverse arcuate rows increasing from top to bottom in their radii from the respective axes of curvature 44, 46 and 48. The teeth are spaced in the rows about equidistantly for the small teeth 52, at slightly increasing spacing from row to row downwardly for the medium teeth 54, and at increasing spacing from row to row downwardly for the large teeth 56, so as to provide a generally staggered relation of the teeth in the longitudinal direction for effective grating.

In the illustrative embodiment, 292 small teeth 52 are provided on the grating surface 27 of the sidewall 26, 50 medium teeth 54 are provided on the grating surface 29 of the sidewall 28, and 26 large teeth 56 are provided on the grating surface 31 of the sidewall 30. The small teeth 52 are intended for grating foodstuffs such as nutmeg, lemon rinds and cheeses into small particles. The medium teeth 54 are intended for grating or shredding vegetables such as turnips into large pieces. The large teeth 56 are intended for grating or stringing vegetables such as potatoes into sticks or the like.

Figure 7:
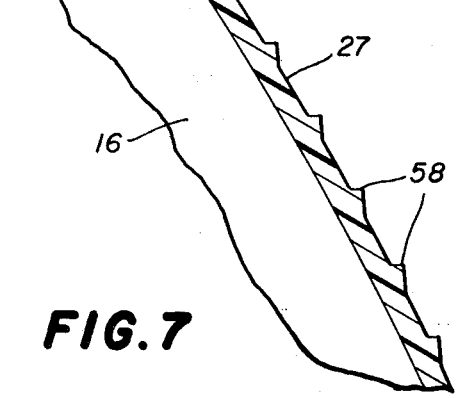
FIG. 7 is an enlarged fragmentary longitudinal sectional view of another sector of the grater, as seen in FIG. 6.
Figure 8:
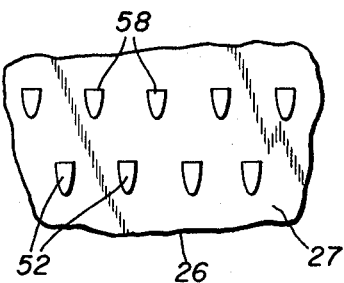
FIG. 8 is a fragmentary elevational view thereof.

Referring to FIGS. 6—8, it will be seen that the sidewall 26 bearing the small teeth 52 is imperforate. The small teeth are of uniform rounded generally conical shape extending substantially longitudinally, except for a small inward draft inclination. Arcuate cutting edges 58 of the teeth face the normally upper closed end 32 of the body 16 and lie in planes substantially perpendicular to the longitudinal axis 24 of the body. Grated material falls down the grating surface 27 of the sidewall 26 for collection.

Referring to FIGS. 3—6, the medium and large teeth 54 and 56 have substantially the same construction except for size, and the teeth of each size are uniform. Cylindrically shaped grating openings 60 and 62 are formed in the sidewalls 28 and 30 about axes parallel to the longitudinal axis 24. The openings are adjacent to the respective medium and large teeth 54 and 56 thereabove. The openings are formed by cylindrical mold inserts, and the teeth are molded around the inserts. Consequently, the teeth extend in directions generally parallel to the longitudinal axis 24. Respective arcuate cutting edges 64 and 66 of the teeth face the closed end 32 of the body 16 and lie in planes substantially perpendicular to the longitudinal axis 24.

Figure 4:
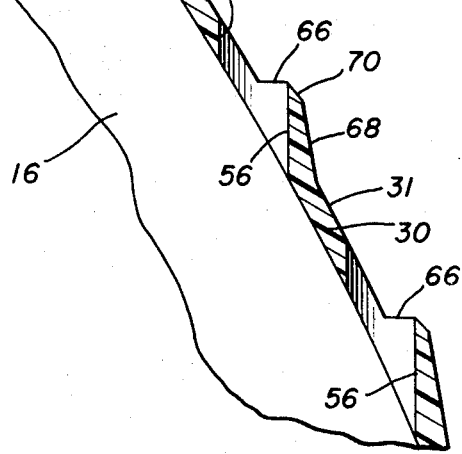
FIG. 4 is an enlarged fragmentary longitudinal sectional view of the grater, taken on irregular line 4—4 of FIG. 3, illustrating one of the sectors thereof.
Figure 5:
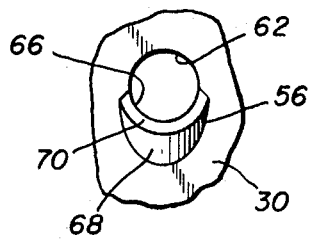
FIG. 5 is a fragmentary top plan view of the structure illustrated in FIG. 4, on the same scale, illustrating one of the grating teeth and an adjacent grating opening thereof.

As illustrated in FIG. 4, the outer surfaces 68 of the large teeth 56 are inclined upwardly and inwardly, at an illustrative angle of 10° to the longitudinal axis 24. The teeth are beveled at their cutting edges 66 to provide cutting surfaces 70 which are inclined upwardly and inwardly, at an illustrative angle of 30° to the longitudinal axis 24. The medium teeth 54 have the same structure.

Materials grated by the large teeth 56 on the grating surface 31 of the sidewall 30 are cut into sticks or the like which pass through the grating openings 62, and cut portions also fall along the grating surface 31 of the wall. Similarly, materials grated or shredded by the medium teeth 54 on the grating surface 29 of the sidewall 28 are cut into small pieces or strips which pass through the grating openings 60, and part of the severed material falls along the grating surface 29 of the wall.

Owing to the molded construction, the sidewalls 26, 28 and 30 and their grating surfaces 27, 29 and 31 may be curved both longitudinally and transversely, and the grating teeth 52, 54 and 56 may be molded integrally therewith to project substantially equidistantly from their respective grating surfaces, as described above. The resulting structure serves to reduce the incidence of finger cuts and abrasions by minimizing hand contact with the teeth in use. Thus, as the hand of the user grasps the material to be grated, and as grating progresses in a downward direction on one of the grating surfaces 27, 29 and 31, the areas of the grating surface adjacent to the area in which the principal pressure is being exerted are curved inwardly away from the pressure area, avoiding contact of the knuckles of the user with the teeth on the adjacent areas above and to the sides of the pressure area.

Referring particularly in FIGS. 3 and 6, an annular support 72 extends laterally outwardly from the grater body 16 therearound at the open end 34 thereof, and is substantially coaxial with the longitudinal axis 24. The support provides means for mounting the grater 12 alternatively on the rim of a bowl for use or storage, or on a flat surface for use, including an annular ledge 74 and an annular band or rim 76. The ledge 74 is constructed in the form of a flat ring having a circular outer periphery, and the band 76 is integral with the outer periphery of the ledge and projects longitudinally beyond the ledge in opposite directions. The ledge 74 has flat longitudinally inner and outer seating surfaces 71 and 73, respectively, on opposite sides thereof, which lie in planes substantially normal to the longitudinal axis 24 of the body 16. The band 76 is joined to the ledge 74 intermediate longitudinally inner and outer margins or edges 75 and 77, respectively, of the band. The surfaces of the margins 75 and 77 lie in planes substantially normal to the longitudinal axis 24.

The support 72 is integrally joined to the grater body 16 by three webs 78 extending laterally outwardly from the body corner portions 36, at the several junctures of the sidewalls 26, 28 and 30. The webs are integral with the open end 34 of the body and extend radially outwardly therefrom. The webs join the support ledge 74 to the body in spaced relation thereto, thereby defining three discharge openings 80, 82 and 84 between the body and the ledge, adjacent the respective sidewalls 26, 28 and 30 and the grating surfaces 27, 29 and 31 thereof. The discharge openings serve to pass grated materials falling along the grating surfaces, for collection beneath the grater.

Two radially extending reinforcing ribs 88 bridge each discharge opening 80, 82 and 84 intermediate the webs 78 defining the respective openings, the ribs being spaced approximately equidistantly from each other and from the webs. The ribs are molded integrally with the open end 34 of the grater body 16 and with the ledge 74. As seen in FIG. 6, the ribs include enlarged foot portions 90 extending longitudinally outwardly, which are coextensive with the outer margin 77 of the band 76. The radially outer ends of the ribs 88 are spaced inwardly from the band 76.

The grater 12 is mounted for use with the body 16 thereof upright, either on a flat surface such as a counter or table top, or on a bowl such as the illustrative bowl 14, on which the grater also may be stored. The grater support band 76 projects beyond the open end 34 of the grater body 16, thereby serving as a support for the grater with the surface of the outer margin 77 of the band seated on a flat surface. When the grater is supported on a horizontal surface, the longitudinal axis 24 thereof is vertical.

The bowl 14 with which the grater 12 may be assembled preferably includes a broad base 92, and an integral circular hollow body 94 of greater diameter and depth than the grater body 16. The bowl body 94 is surmounted by an integral annular rim 96, which in the illustrative embodiment is out-turned and is preferably provided with a flat upper surface. The upper surface of the bowl rim lies in a plane parallel to the supporting surfaces of the bowl base 92.

As illustrated in FIG. 6, the grater 12 seats on the bowl rim 96, with one or the other of the ledge seating surfaces 71 and 73 engaging the bowl rim. The grater 12 is mounted on the bowl rim 96 for use with the outer seating surface 73 engaging the bowl rim and the grater body 16 extending upwardly therefrom outside the bowl 14, as illustrated in full lines. The grater 12 is mounted on the bowl rim 96 for storage with the inner seating surface 71 engaging the bowl rim and the grater body 16 extending downwardly therefrom inside the bowl 14, as illustrated in phantom lines. When the bowl 14 is supported on a horizontal surface, the longitudinal axis 24 of the grater 12 is vertical in each case.

The outwardly projecting portion of the grater support band 76, having the outer margin 77, serves to secure the grater 12 in place on the bowl rim 96 for use, by lateral engagement with the rim therearound, as shown in full lines in FIG. 6. The spacing of the ribs 88 from the band 76 serves for receiving the bowl rim 96 therebetween, in engagement with the outer seating surface 73 of the ledge 74 and adjacent to the band. Likewise, when the grater 12 is inverted for storage with the grater body 16 in the bowl 14, the inwardly projecting portion of the band 76, having the inner margin 75, laterally engages the rim 96 while the inner seating surface 71 of the ledge 74 is seated thereon, to secure the grater on the bowl in the storage position illustrated in phantom lines in FIG. 6. The respective use and storage positions of the grater 12 are also illustrated in FIGS. 1 and 2.

The reinforcing ribs 88 provide support for the grater body 16 when the grater is supported on the bowl 14 by the support ledge 74, supplementing the support provided by the webs 78. Also when the grater is used on a flat surface, the greater body 16 is supported both by the support 72 and web 78 structure, and by the foot portions 90 of the ribs 88, to provide a strong base of support.

Inasmuch as the grater support 72 is external to the grater body 16, the grater body is supported above the bowl 14 for use thereon entirely within the periphery of the bowl rim 96, with the open end 34 of the grater body spaced radially inwardly from the bowl rim. Consequently, grating forces exerted downwardly on the grating surfaces 27, 29 and 31 will be directed along lines falling within the periphery of the bowl rim 96, to avoid tipping the bowl or causing it to slide. The broad base 92 of the bowl also imparts stability and serves to prevent sliding movement.

The grater discharge openings 80, 82 and 84 are encompassed by the bowl rim 96 in use of the grater 12 on the bowl 14, for collecting grated material which falls on the grating surfaces 27, 29 and 31 and passes through the discharge openings, together with grated material which passes through the grating openings 60 and 62 in the sidewalls 28 and 30. The grater body 16 is received within the bowl 14 for storage, while the grater is supported on the bowl rim 96 by the support 72, with the grater body 16 spaced from the body 94 and the base 92 of the bowl, as illustrated in phantom lines in FIG. 6. The grater is thus substantially protected from damage while being compactly stored in the bowl with which it is to be used.

In use, with the grater 12 mounted above the bowl 14 as shown in FIGS. 1 and 6, the user may hold the grater at its center by pressing the fingers of one hand against the end wall 42 of the grater, within or against the end wall 42 of the grater, within or against the ridge 40. The material to be grated is grasped with the other hand, and the material is moved downwardly against the appropriate grating surface 27, 29 or 31, and against the cutting edges 58, 64 or 66 of the teeth 52, 54 or 56 thereon. The material is grated and at least in part falls along the grating surface 27, 29 or 31 and passes through a discharge opening 80, 82 or 84, respectively. When employing either of the grating surfaces 29 and 31 bearing the medium and large teeth 54 and 56, respectively, grated material also passes through the grating openings 60 or 62. The grated material which passes through the discharge and grating openings is collected in he bowl 14. Owing to the described longitudinally and transversely curved construction of the grating surfaces 27, 29 and 31, and the equidistant projection of the grating teeth 52, 54 and 56 therefrom, inadvertent contact of the fingers with the grating teeth is minimized as the material is moved along the grating surfaces.

The grater body 16 is rigidly supported during such use by the support 72, web 78 and rib 88 structure. A broad base of support is provided by the bowl base 92 and the grater support 72, and the downward grating forces are exerted on the grater body within the periphery of the bowl rim 96, so that the user may grate materials easily and rapidly without tipping the assembly and without sliding motion on the surface which supports the bowl.

The prior problems are avoided, of clearing and cleaning a suitable work surface, or finding a bowl suitable for collecting the grated material, which still may be inconvenient or insecure. After grating the material, the collecting bowl 14 may be used for mixing and serving the contents, with no need to transfer the material to another bowl. The grater is open and accessible for rapid and thorough cleaning following use, and it may be stored between uses in the clean bowl ready for the next use.

The grater 12 may, alternatively, be used alone on any convenient generally flat surface. In such use, the grater is supported on the outer margin 77 of the band 76 and the foot portions 90 of the ribs 88. Materials are grated in the same manner as when working on a bowl, with grated materials collecting on the supporting surface. It is evident, however, that when considerable material is being grated, or when relatively large lengths of material are to be cut, it is most convenient to use the grater 12 on the bowl 14 for collecting the material, and the surrounding areas will stay clean and neat.

The grater 12 is constructed economically of plastic in a single molding operation, and it is lightweight, strong and durable. The bowl 14 or a similar bowl is economical and lightweight, and it may also serve for general kitchen use. The grater 12 is similarly adapted for use with general purpose bowls as may be available, provided that their rims will serve for engagement with the grater support 72. As described above, the base of the bowl should also be relatively broad for stability.

While preferred embodiments of the new grater and the new grater assembly have been illustrated and described, it will be apparent to those skilled in the art that various changes and modifications may be made therein within the spirit and scope of the invention. It is intended that such changes and modifications be included within the scope of the appended claims.

What I claim is:

1. A manual grater molded of synthetic thermoplastic resinous material and comprising a body having an external grating surface inclined to the longitudinal axis of the body divergently in a direction from one end to an opposite end of the body, said grating surface being curved convexly both longitudinally and transversely, a plurality of grating teeth integral with said grating surface in spaced longitudinal and transverse relation thereon and projecting outwardly therefrom facing said one end of said body, said teeth projecting substantially equidistantly from said grating surface for minimizing hand contact with said teeth in use, and support means extending laterally outwardly from said body therearound at said opposite end thereof and integrally joined thereto, said support means comprising means for mounting the grater on the rim of a bowl for use including a surface lying in a plane substantially normal to said axis for seating engagement with said rim, whereby the grater is adapted for grating material downwardly on said grating surface over a bowl on which the grater is mounted.

2. A manual grater molded of synthetic thermoplastic resinous material and comprising a hollow body having a plurality of integral sidewalls inclined to the longitudinal axis of the body divergently in a direction from one end to an opposite end of the body, said sidewalls each having an external grating surface curved convexly both longitudinally and transversely, and a plurality of grating teeth integral with each of said grating surfaces in spaced longitudinal and transverse relation thereon and projecting outwardly substantially equidistantly therefrom facing said one end of said body, whereby the grater is adapted for use with said axis extending vertically and said one end of said body uppermost for grating material downwardly on said grating surfaces while minimizing hand contact with said teeth.

3. A grater as defined in claim 2 including an annular support extending laterally outwardly from said body therearound at said opposite end thereof and integrally joined thereto, said support comprising means for mounting the grater alternatively on the rim of a bowl or on a flat surface for use including surfaces lying in planes substantially normal to said axis for seating engagement with said rim and with said flat surface, respectively.

4. A grater as defined in claim 3 including means forming discharge openings between said body and said support adjacent respective said sidewalls, whereby grated material passes through said discharge openings is use and may be collected in a bowl on which the grater is mounted.

5. A grater as defined in claim 3 wherein said support comprises a ledge and an integral band having said seating surfaces, said ledge supporting the grater on the rim of a bowl for use, and said band projecting longitudinally beyond said ledge for alternatively securing the grater on a bowl when supported on the rim thereof or supporting the grater on a flat surface for use.

6. A manual grater molded of synthetic thermoplastic resinous material and comprising a hollow body having a plurality of integral sidewalls inclined to the longitudinal axis of the body divergently in a direction from one end to an opposite open end of the body, said sidewalls each having an external grating surface, each of said grating surfaces being curved convexly both longitudinally and transversely, a plurality of grating teeth integral with each of said grating surfaces in spaced longitudinal and transverse relation thereon and projecting outwardly therefrom facing said one end of said body, said teeth projecting substantially equidistantly from said grating surface for minimizing hand contact with said teeth in use, means forming grating openings adjacent to said teeth in at least one of said sidewalls, an annular support extending laterally outwardly from said body therearound at said open end thereof and integrally joined thereto, said support comprising means for mounting the grater alternatively on the rim of a bowl or on a flat surface for use including surfaces lying in planes substantially normal to said axis for seating engagement with said rim and with said flat surface respectively, and means forming discharge openings between said body and said support adjacent respective ones of said sidewalls, whereby the grater is adapted for grating material downwardly on said grating surfaces over said bowl or flat surface on which the grater is mounted and grated material passes through said grating openings and said discharge openings and may be collected in said bowl.

7. A grater as defined in claim 6 wherein said support comprises a ledge and an integral band, said ledge having surfaces on opposite sides thereof lying in planes substantially normal to said axis for seating the grater on the rim of a bowl with said body disposed alternatively outside the bowl for use or inside the bowl for storage, said band projecting longitudinally beyond said ledge in opposite directions for securing the grater on a bowl when seated on the rim thereof in either of said body dispositions, and said band having a surface on the longitudinally outer margin thereof lying in a plane substantially normal to said axis for seating the grater on a flat surface for use.

8. A grater as defined in claim 7 including webs extending laterally outwardly from said body at the junctures of said sidewalls at said open end of the body and integrally joining said ledge to said body in spaced relation thereto, thereby defining said discharge openings.

9. A grater as defined in claim 8 including integral reinforcing ribs bridging said discharge openings intermediate said webs and coextensive with the longitudinally outer margin of said band for providing additional body support when the grater is seated for use in said alternative ways.

10. A manual grater molded of synthetic thermoplastic resinous material and comprising a hollow body having three sidewalls inclined to the longitudinal axis of the body divergently in a direction from a closed end to an opposite open end of the body, said sidewalls each having an external grating surface curved convexly both longitudinally and transversely, said sidewalls being integrally joined by similarly inclined corner portions having external surfaces curved convexly both longitudinally and transversely, an integral closure at said closed end of said body forming a curved triangular ridge with said sidewalls and corner portions and including a recessed end wall bounded by said ridge, a plurality of grating teeth integral with each of said grating surfaces in spaced longitudinal and transverse relation thereon and projecting outwardly substantially equidistantly therefrom facing said closed end of said body, means forming grating openings adjacent said teeth in at least part of said sidewalls, an annular ledge extending laterally outwardly from said body therearound at said open end thereof, said ledge having surfaces on opposite sides thereof lying in planes substantially normal to said axis for seating the grater on the rim of a bowl with said body disposed alternatively outside the bowl for use or inside the bowl for storage, webs extending laterally outwardly from said corner portions at said open end of said body and integrally joining said ledge to said body in spaced relation thereto, thereby defining discharge openings between said body and said ledge adjacent respective said sidewalls, and an annular band integral with said ledge and projecting longitudinally beyond the ledge in opposite directions for securing the grater on a bowl when seated on the rim thereof in either of said body dispositions, said band having a surface on the longitudinally outer margin thereof lying in a plane substantially normal to said axis for seating the grater on a flat surface for use, whereby the grater is adapted for grating material downwardly on said grating surfaces over said bowl or flat surface on which the grater is seated for use while minimizing hand contact with said teeth, and grated material passes through said grating openings and said discharge openings and may be collected in said bowl.

11. A grater as defined in claim 10 wherein said resinous material is acrylonitrile-butadiene-styrene copolymer.

12. A grater as defined in claim 10 wherein said resinous material is polypropylene.

13. A grater assembly which comprises, in combination, a grater as defined in claim 3, and a bowl having a rim engageable with a said seating surface for mounting the grater thereon for use.

14. A grater assembly which comprises, in combination, a grater as defined in claim 6, and a bowl having a rim engageable with a said seating surface for mounting the grater thereon for use, said bowl rim encompassing said discharge openings for collecting grated material which passes through the discharge openings together with grated material which passes through said grating openings.

15. A grater assembly which comprises, in combination, a grater as defined in claim 7, and a bowl having a rim engageable with said ledge seating surfaces adjacent to said band for mounting the grater thereon in either of said body dispositions, said bowl rim encompassing said discharge openings in use for collecting grated material which passes through the discharge openings together with grated material which passes through said grating openings, and said bowl receiving said body therein for storage.

16. A grater assembly which comprises, in combination, a grater as defined in claim 10, and a bowl having a broad base and a body surmounted by an annular rim, said rim being engageable with said ledge seating surfaces adjacent to said band for mounting the grater thereon in either of said grater body dispositions, said bowl rim encompassing said discharge openings in use for collecting grated material which passes through the discharge openings together with grated material which passes through said grating openings, and said bowl receiving said grater body therein in spaced relation to said bowl base and body for storage.

17. A grater as defined in claim 2, wherein each of said grating surfaces is transversely curved convexly on increasing radii of curvature about a corresponding one of three longitudinally extending axes of curvature, said axes of curvature being equidistantly spaced from the longitudinal axis of said body and spaced equiangularly therearound.

18. A manual grater molder of synthetic thermoplastic resinous material and comprising a hollow body having a plurality of integral sidewalls inclined to the longitudinal axis of the body divergently in a direction from one end to an opposite open end of the body, said sidewalls each having an external grating surface, a plurality of grating teeth integral with each of said grating surfaces in spaced longitudinal and transverse relation thereon and projecting outwardly therefrom facing said one end of said body, means forming grating openings adjacent to said teeth in at least one of said sidewalls, an annular support extending laterally outwardly from said body therearound at said open end thereof and integrally joined thereto, said support comprising means for mounting the grater alternatively on the rim of a bowl or on a flat surface for use including surfaces lying in planes substantially normal to said axis for seating engagement with said rim and with said flat surface respectively, a plurality of webs extending laterally outwardly from said body at the junctures of said sidewalls at said open end of the body and integrally joining said support to said body in spaced relation thereto for thereby defining discharge openings between said body and said support adjacent to respective ones of said sidewalls, whereby the grater is adapted for grating material downwardly on said grating surfaces over said bowl or flat surface on which the grater is mounted and grated material passes through said grating openings and said discharge openings and may be collected in said bowl.